C. P. BUCKINGHAM.
CULTIVATOR.
No. 183,121. Patented Oct. 10, 1876.
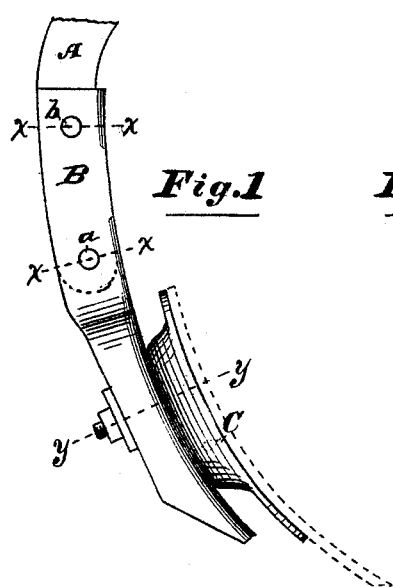
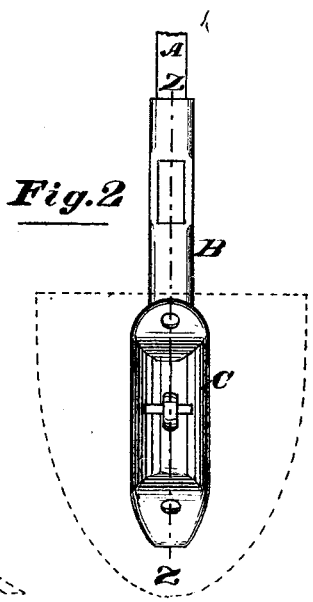
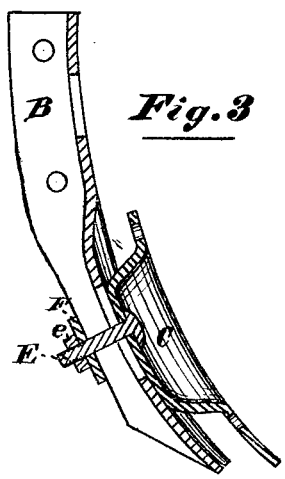
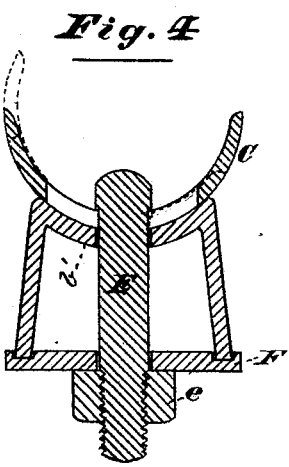
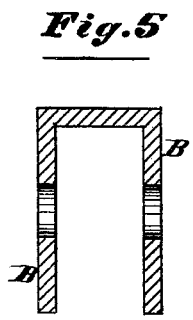
Attest
W. S. Baker
L. W. Harris
Inventor
Catharanus P. Buckingham
By Coburn & Thacher
Attorneys
JAMES R. OSGOOD & CO BOSTON

UNITED STATES PATENT OFFICE.

CATHARANUS P. BUCKINGHAM, OF CHICAGO, ILLINOIS.

IMPROVEMENT IN CULTIVATORS.

Specification forming part of Letters Patent No. 183,121, dated October 10, 1876; application filed August 17, 1876.

*To all whom it may concern:*

Be it known that I, CATHARANUS P. BUCKINGHAM, of Chicago, in the county of Cook and State of Illinois, have invented a new and useful Improvement in Cultivators, which is fully set forth in the following specification, reference being had to the accompanying drawings, in which—

Figure 1 represents a side view of a cultivator beam, sleeve, and shovel-block, the shovel being shown in dotted lines; Fig. 2, a front view of the same; Fig. 3, a longitudinal section taken on the line $z\,z$, Fig. 2; Fig. 4, a cross-section on an enlarged scale, taken on the line $y\,y$, Fig. 1.

My invention relates to the construction of the sleeve, to which is attached the shovel-block, and which, in turn, is pivoted to the beam.

The invention consists in making the lower end of the sleeve with a groove or circular depression in its front side, to receive the convex side of the shovel-block.

In the drawings, A represents a cultivator-beam of ordinary construction, to the rear end of which is pivoted the sleeve or shank-beam in the usual manner at $a$. These two parts are also connected by the common wooden brake-pin $b$. The cultivator-beam A is of rectangular form, unless changed for some specific purpose.

The upper end of the sleeve B is made rectangular in form, as shown in Figs. 3 and 5 of the drawings, so that it will accurately fit over the end of the beam A, and without changing the latter from the ordinary form of the bar.

In order to insure firm bearing-surfaces, so that the shovel will be firmly supported by the block, and the latter, in turn, by the sleeve, I prefer to use a shovel-block, C, of the construction shown in the drawings. This shovel-block C is struck up in suitable dies, with one side convex, and the other side concave, as shown in Fig. 3 of the drawings. The block is curved upon its concave side, to correspond with the convexity of the shovel D, so as to closely fit the latter when it is applied to the block, as shown in dotted lines of Figs. 1 and 2 of the drawings. The depression or concavity in the upper side of the sleeve at its lower end is made of such form as to receive the convex surface of the shovel-block C.

The concavity in the sleeve B is intended to be a little deeper at its center than the convexity of the shovel-block, so that the bearing of the block will be at or near its sides and ends, making a wide bearing-surface for the shovel-block.

The block C is provided with a transverse slot, through which the bolt E is inserted, by means of which the block is secured to the sleeve. The bolt E passes through the longitudinal slot in the sleeve, and is fastened to the latter by means of a fixed washer, F, and nut $e$—common devices for this purpose.

By this construction of the sleeve with a concavity in its front side, as above described, I secure the same amount of bearing-surface between the shovel-block and sleeve, whatever may be the relative position of the two—that is, if the block is adjusted vertically upon the sleeve for the purpose of raising or lowering the shovels; or, if it is turned sidewise, as shown by dotted lines in Fig. 4 of the drawings, so as to adjust the shovels at an angle with the sleeve, the bearing-surface will always be the same for the reason that the convex surface of the block rests in the concavity of the sleeve.

In shovel-blocks and sleeves as heretofore constructed and united when the sleeve is stamped in one piece this desirable result has not been obtained; but a change in the bearing has been produced whenever the block was adjusted upon the sleeve, especially in the lateral adjustment effected by turning the block upon the sleeve.

The sleeve is made of wrought metal, and is bent in suitable dies, and both it and the block may be made of any metal which can be wrought in the manner described. I prefer, however, to make them of steel, for the additional strength and durability thus obtained sufficiently compensate for the comparatively additional expense.

Having thus described my invention, what

I claim as new, and desire to secure by Letters Patent, is—

The wrought-metal sleeve or shank B, formed from a blank bent or folded into the shape described and shown, and provided with a lateral concavity, $b'$, in its front side, at the lower end thereof, adapted to receive the convex surface of the wrought-metal shovel-block C, substantially as and for the purpose set forth.

C. P. BUCKINGHAM.

Witnesses:
L. M. HARRIS,
L. L. COBURN.